(12) United States Patent
Ly-Gagnon et al.

(10) Patent No.: US 8,787,230 B2
(45) Date of Patent: Jul. 22, 2014

(54) VOICE ACTIVITY DETECTION IN COMMUNICATION DEVICES FOR POWER SAVING

(75) Inventors: Yann Ly-Gagnon, San Jose, CA (US); Paul J. Husted, San Jose, CA (US); Michael Peter Mack, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 13/329,902

(22) Filed: Dec. 19, 2011

(65) Prior Publication Data

US 2013/0155926 A1 Jun. 20, 2013

(51) Int. Cl.
*G08C 17/00* (2006.01)
*H04B 7/185* (2006.01)

(52) U.S. Cl.
USPC .......................................... 370/311; 370/318

(58) Field of Classification Search
USPC .................................................. 370/311, 318
See application file for complete search history.

(56) References Cited

U.S. PATENT DOCUMENTS

| | | | |
|---|---|---|---|
| 6,347,081 B1* | 2/2002 | Bruhn | 370/337 |
| 6,381,451 B1 | 4/2002 | Parisel et al. | |
| 6,493,326 B1* | 12/2002 | Ramachandran | 370/311 |
| 8,498,678 B2* | 7/2013 | Tsfaty et al. | 455/574 |
| 8,504,054 B2* | 8/2013 | Jain et al. | 455/453 |
| 2002/0097691 A1* | 7/2002 | Willenegger et al. | 370/318 |
| 2005/0038651 A1* | 2/2005 | Zhang et al. | 704/233 |
| 2005/0107843 A1* | 5/2005 | McDermott et al. | 607/57 |
| 2006/0252457 A1* | 11/2006 | Schrager | 455/556.1 |
| 2007/0230386 A1* | 10/2007 | Beach | 370/311 |
| 2009/0092091 A1* | 4/2009 | Balasubramanian | 370/329 |
| 2009/0190513 A1* | 7/2009 | Islam et al. | 370/311 |
| 2009/0296616 A1* | 12/2009 | Lim et al. | 370/311 |
| 2011/0038362 A1* | 2/2011 | Vos et al. | 370/352 |
| 2011/0274021 A1 | 11/2011 | He et al. | |
| 2012/0120858 A1* | 5/2012 | Das et al. | 370/311 |
| 2012/0195242 A1* | 8/2012 | Pyles et al. | 370/311 |

FOREIGN PATENT DOCUMENTS

| | | |
|---|---|---|
| EP | 1261176 A1 | 11/2002 |
| WO | 2007091956 A2 | 8/2007 |
| WO | 2009124806 A1 | 10/2009 |
| WO | 2013096476 | 6/2013 |

OTHER PUBLICATIONS

International Search Report and Written Opinion—PCT/US2012/070667—ISA/EPO—Mar. 14, 2013.
"PCT Application No. PCT/US2012/070667 Written Opinion of the IPEA", Nov. 19, 2013 , 5 pages.

* cited by examiner

*Primary Examiner* — Warner Wong
(74) *Attorney, Agent, or Firm* — DeLizio Gilliam, PLLC (57) ABSTRACT

A mechanism can be implemented in a communication unit of a network device to utilize periods of silence encountered in voice communication to conserve power at the network device. In some embodiments, it can be determined that one or more packets of a received RF signal comprise audio data. The communication unit of the network device can determine whether the audio data associated with the one or more packets comprises voice information. The network device can switch to a power save mode based, at least in part, on determining that the audio data associated with the one or more packets does not comprise voice information.

37 Claims, 5 Drawing Sheets

VOICE ACTIVITY DETECTION IN COMMUNICATION DEVICES FOR POWER SAVING

BACKGROUND

Embodiments of the inventive subject matter generally relate to the field of communication networks and, more particularly, to a voice activity detection based mechanism for power saving in communication devices.

Voice communication is a common application for Bluetooth® devices. Voice communication comprises transfer of voice information (e.g., data bits that are generated when one user speaks to another user) and silence information (e.g., data bits that represent silence and that are generated when the user is not speaking, based on background noise, etc.). Typically, the voice information constitutes 20% of the voice communication. In other words, a user typically speaks for 20% of the time and is silent for almost 80% of the time during which the user communicates.

SUMMARY

Various embodiments of a power saving mechanism that employs voice activity detection are described. In one embodiment, a radio frequency (RF) signal (e.g., a Bluetooth signal) comprising one or more packets is received at a first communication device from a second communication device of a communication network. It is determined that the one or more packets comprise audio data. It is determined whether the audio data associated with the one or more packets comprises voice information. The first communication device is switched to a power save mode based, at least in part, on determining that the audio data associated with the one or more packets does not comprise voice information.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to a voice activity detection based power save mechanism for Bluetooth® devices, embodiments are not so limited. In other embodiments, network devices that implement various other communication standards (e.g., wireless local area network (WLAN), WiMAX, etc.) can execute the voice activity detection based power save techniques described herein. It is also noted that although examples describe a power save mechanism based on analyzing voice communication packets, the power save mechanism can also be employed when other suitable synchronous connection (SCO) packets are being exchanged. In other instances, well-known instruction instances, protocols, structures, and techniques have not been shown in detail in order not to obfuscate the description.

Voice communication typically comprises long periods of silence (e.g., for about 80% of the time) interspersed with short bursts of voice information (e.g., for about 20% of the time). Existing power save techniques typically rely on the received signal strength indicator (RSSI) associated with incoming RF signals, exchanged during the voice communication, to determine whether a network device should switch to a power save mode. For example, the existing power save techniques can determine (e.g., at a receiver antenna of the network device) the RSSI associated with an incoming RF signal. The existing power save techniques can cause the network device to switch to the power save mode (e.g., by disabling or powering down one or more processing components) if the RSSI associated with the incoming RF signal is less than a threshold RSSI. In other words, the existing power save techniques determine whether the network device should switch to the power save mode based on the strength of the incoming RF signal (e.g., which can be indicative of the separation between the network device and another transmitting network device). The existing power save techniques do not take the content of the incoming RF signal into consideration while determining whether the network device should switch to the power save mode. Relying solely on the RSSI associated with the incoming RF signal to determine whether to switch to the power save mode can cause the network device to incorrectly switch to power save mode when voice information is being received, if the RSSI associated with the incoming RF signal is less than the threshold RSSI. This can affect the communication and degrade the performance of the network device.

A power save unit associated with a receiver unit of a network device can be configured to leverage the long periods of silence in the voice communication to conserve power at the network device. In other words, the power save unit can implement functionality to cause the network device to switch to the power save mode based on the content (e.g., the presence or absence of voice information) of the incoming RF signals. The power save unit can comprise a voice activity detector that can detect whether the incoming RF signal (i.e., decoded audio bits extracted from the RF signal) comprise voice information. If the incoming RF signal does not comprise voice information, one or more components of the receiver unit can be disabled (or configured in a low power mode). Such a power save mechanism using voice activity detection can reduce power consumption and can improve performance and efficiency of the network device.

Figure 1:
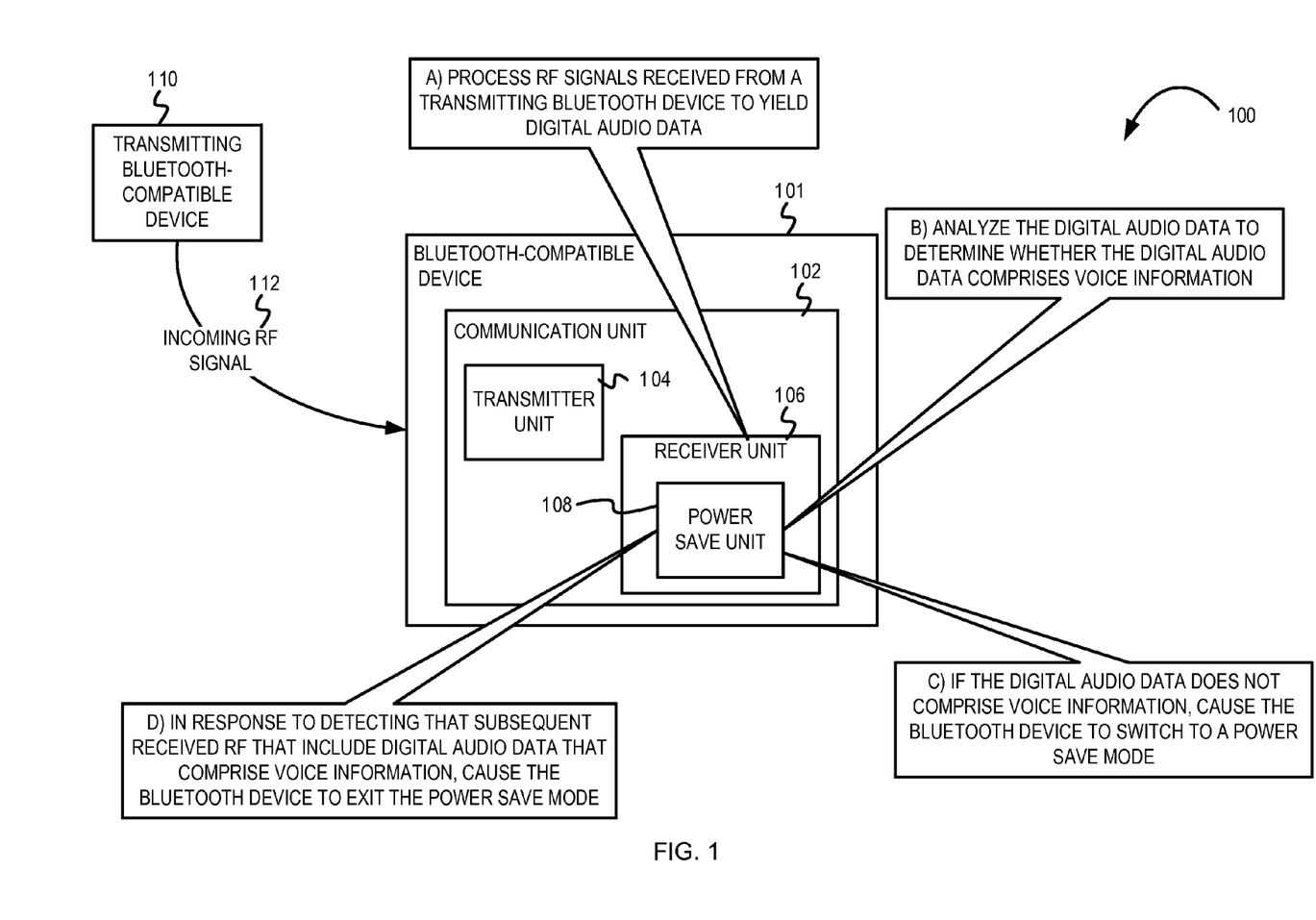
FIG. 1 is a conceptual diagram illustrating a power save mechanism that employs voice activity detection.

FIG. 1 is a conceptual diagram illustrating a power save mechanism that employs voice activity detection. FIG. 1 depicts a Bluetooth-compatible device 101 and a transmitting Bluetooth-compatible device 110. The Bluetooth-compatible device 101 comprises a communication unit 102. The communication unit 102 can implement protocols and functionality to enable Bluetooth communication in a wireless communication network 100. The communication unit 102 comprises a transmitter unit 104 and a receiver unit 106. The receiver unit 106 comprises a power save unit 108. In some implementations, the Bluetooth-compatible device 101 can be an electronic device with Bluetooth communication capabilities, such as a laptop computer, a tablet computer, a mobile phone, a headset, a smart appliance, a gaming console, or other suitable electronic devices. It is also noted that in addition to Bluetooth communication protocols, the communication unit 102 can implement other protocols and functionality (e.g., wireless local area network (WLAN), Ethernet, WiMAX, powerline communication protocols, etc.) to enable other types of communications. Although not depicted in FIG. 1, in some implementations, the transmitter unit 104 can also comprise a power save unit. In other implementations, the transmitter unit 104 and the receiver unit 106 can share a common power save unit. In this implementation, the shared power save unit may be embodied as part of the transmitter unit 104, the receiver unit 106, or another suitable processing unit of the Bluetooth-compatible device 101.

In some embodiments, the communication unit 102 can be implemented as a system on a chip (SoC) on a Bluetooth headset that is communicatively coupled to a mobile phone. In another embodiment, the communication unit 102 can be implemented as an SoC on a Bluetooth-compatible mobile phone that is communicatively coupled with a Bluetooth headset. In some implementations, the SoC can comprise a radio unit (e.g., transceiver), an analog front end (e.g., analog preprocessing components such as amplifiers, filters, mixers, automatic gain control unit, etc.), and other suitable processing components. Furthermore, it is noted that one or more components of the power save unit can be implemented on the same device (i.e., the same SOC) or in a distributed manner (i.e., distinct integrated circuits). For example, as will be described below, the power save unit can comprise a voice activity detector (VAD) that can be implemented on the Bluetooth headset, on the mobile phone associated with the Bluetooth headset, on a communication network, etc.

At stage A, the receiver unit 106 processes one or more RF signals 112 received from the transmitting Bluetooth-compatible device 110 to yield digital audio data. As described above, data bits that are generated during voice communication (e.g., when users are speaking or when the users are silent) are herein referred to as the digital audio data. As will be further described in FIG. 2, the received RF signals 112 can be amplified, down-converted to a lower intermediate frequency, filtered, and converted from the analog domain to the digital domain. The receiver unit 106 can then demodulate and decode the digital representation of the received RF signals 112 to extract digital audio data (e.g., data bits that were generated for transmission by the transmitting Bluetooth-compatible device 110).

At stage B, the power save unit 108 analyzes the digital audio data (extracted at stage A) to determine whether the digital audio data comprises voice information. The power save unit 108 can execute various suitable voice activity detection techniques to determine whether the digital audio data comprises voice information, as will be further described in FIG. 2. The power save unit 108 can determine whether the Bluetooth-compatible device 101 should enter or exit a power save mode (e.g., a low power operating mode) depending on whether voice information is detected.

At stage C, if the digital audio data does not comprise voice information, the power save unit 108 causes the Bluetooth-compatible device 101 to switch to the power save mode. In one implementation, if the digital audio data does not comprise voice information, the power save unit 108 can disable one or more components of the receiver unit 106. As will be described in FIG. 2, the power save unit 108 can disable one or more receive chains of the receiver unit 106. In another implementation, the power save unit 108 can vary the power supplied to or can vary the bias of one or more processing components (e.g., mixer units, analog-to-digital converters, etc.) of the receiver unit 106. In some implementations, if the digital audio data does not comprise voice information, the power save unit 108 may cause the receiver unit 106 to receive and process only a subset of the incoming packets (e.g., process only every other incoming packet).

At stage D, in response to detecting that subsequent RF signals received at the receiver unit 106 that include digital audio data comprise voice information, the power save unit 108 causes the Bluetooth-compatible device 101 to exit the power save mode. In one implementation, if the power save unit 108 determines that subsequently received RF signals comprise voice information (e.g., based on analyzing the digital audio data from the subsequently received RF signals), the power save unit 108 can enable the previously disabled components of the receiver unit 106, increase the power provided to or the bias of the appropriate processing components, etc. Additionally, if the receiver unit 106 was configured to receive a fewer number of packets at stage C, the power save unit 108 can configure the receiver unit 106 to receive and decode all of the incoming packets.

Figure 2:
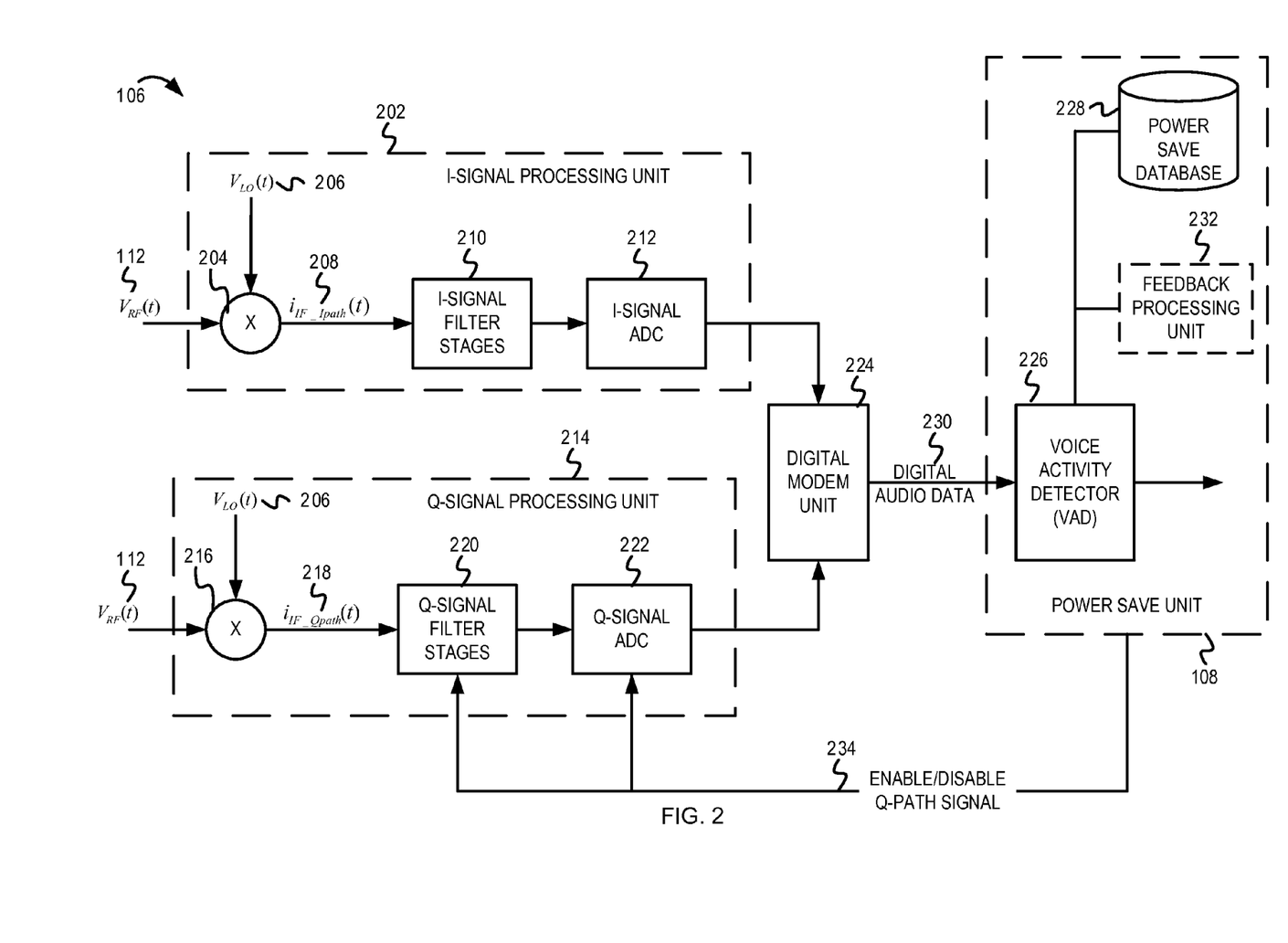
FIG. 2 is a block diagram illustrating an example embodiment of a receiver unit including the power save mechanism that employs voice activity detection.

FIG. 2 is a block diagram illustrating an example embodiment of the receiver unit 106 including the power save mechanism that employs voice activity detection. The receiver unit 106 comprises an in-phase (I) signal processing unit 202, a quadrature (Q) signal processing unit 214, and the power save unit 108. The I-signal processing unit 202 comprises a mixer 204, I-signal filter stages 210, and an I-signal analog-to-digital converter (ADC) 212. The Q-signal processing unit 214 comprises a mixer 216, Q-signal filter stages 220, and a Q-signal ADC 222. The I-signal ADC 212 and the Q-signal ADC 222 are coupled with a digital modem unit 224. The digital modem unit 224 is further coupled with a voice activity detector (VAD) 226 of the power save unit 108. The power save unit 108 also comprises a power save database 228 and a feedback processing unit 232. The feedback processing unit 232 and the VAD 226 are coupled with the power save database 228. It should be noted that although FIG. 2 describes the receiver unit 106 as comprising the I-signal processing unit 202, the Q-signal processing unit 214, and the power save unit 108, embodiments are not so limited. In other embodiments, one or more of the components can be shared or used in conjunction with other circuits or processing modules of the communication unit 102 (e.g., the transmitter unit 104). For example, the power save unit 108 can be shared with the transmitter unit 104.

An incoming RF signal ($V_{RF}$) 112 is received (e.g., from the transmitting Bluetooth device 110) at the receiver unit 106 of the Bluetooth device 101. The received RF signal 112 is provided to the I-signal processing unit 202 and the Q-signal processing unit 214. In the I-signal processing unit 202, the I-signal mixer 204 combines the received RF signal ($V_{RF}$) 112 with a local oscillator (LO) signal ($V_{LO}$) 206 to yield a signal at an intermediate frequency (IF), herein referred to as an "intermediate frequency signal" 208. The intermediate frequency can be the difference between the RF frequency of the received RF signal 112 and the LO oscillator frequency of the LO signal 206. In one example, the intermediate frequency can be 800 kHz. In one implementation, the I-signal mixer 204 can be a current-mode active mixer. Therefore, the intermediate frequency signal 208 can be a current signal ($i_{IF\_Ipath}$) at the intermediate frequency. It is noted that in other implementations, the I-signal mixer 204 can be another suitable type of mixer. The intermediate frequency signal 208 at the output of the I-signal mixer 204 is provided to the I-signal filter stages 210. In some implementations, the I-signal filter stages 210 can comprise a first order low pass filter (LPF), a resistor-capacitor (RC) notch filter, and/or other suitable filters. The I-signal filter stages 210 can filter the intermediate frequency signal 208 to yield the in-phase component of the intermediate frequency signal ("I-signal"). The I-signal ADC 212 can then convert the analog I-signal into its corresponding digital representation. In some implementations, the digital representation of the I-signal can be a 96 Mbps signal.

In the Q-signal processing unit 214, the Q-signal mixer 216 combines the received RF signal ($V_{RF}$) 112 with the local oscillator (LO) signal ($V_{LO}$) 206 to yield an intermediate frequency signal 218. In one implementation as depicted in FIG. 2, the Q-signal mixer 216 can be a current-mode active mixer. Therefore, the intermediate frequency signal 218 can be a current signal ($i_{IF\_Qpath}$) at the intermediate frequency. It is noted that in other implementations, the Q-signal mixer 216 can be another suitable type of mixer. The intermediate frequency signal 218 at the output of the Q-signal mixer 216 is provided to the Q-signal filter stages 220. In some implementations, the Q-signal filter stages 220 can comprise a first order LPF, an RC notch filter, and/or other suitable filters. The Q-signal filter stages 220 can filter the intermediate frequency signal 218 to yield a quadrature component of the intermediate frequency signal ("Q-signal"). The Q-signal ADC 222 can then convert the analog Q-signal into its corresponding digital representation. In some implementations, the digital representation of the Q-signal can be a 96 Mbps signal.

The I-signal at the output of the I-signal ADC 212 and the Q-signal at the output of the Q-signal ADC 222 are then provided to the digital modem unit 224. The digital modem unit 224 can comprise a demodulator, a decoder, and/or other processing units to extract digital audio/voice data 230 (e.g., pulse coded modulation (PCM) data) that was transmitted by the transmitting Bluetooth device 110. The digital audio data 230 is provided to the VAD 226 of the power save unit 108. The VAD 226 can employ various suitable techniques to determine whether the digital audio data 230 comprises voice information. In one implementation, a power detection mechanism can be employed for detecting whether the digital audio data 230 comprises voice information. The power level (or energy) associated with the digital audio data 230 can be compared against a threshold power level (or threshold energy). The VAD 226 can indicate that the digital audio data 230 comprises voice information if the power level of the digital audio data 230 exceeds the threshold power level. The power detection mechanism can be executed in the time domain (as depicted in Eq. 1a) or in the frequency domain (as depicted by Eq. 1b). In Eq. 1a and Eq. 1b, x[n] represents a digital audio data bit at the $n^{th}$ time instant, L represents the total number of time instants (or the total number of bits) that will be used to calculate the power level, and X(ω) is the frequency domain representation of the power level of the digital audio data 230. The relationship between X(ω) and x[n] is represented in Eq. 1c.

$$\text{If } \sum_{n=1}^{L} x[n]^2 > \text{threshold power, then voice is present} \quad \text{Eq. 1a}$$

$$\text{If } X(\omega) > \text{threshold power, then voice is present} \quad \text{Eq. 1b}$$

$$X(\omega) = \sum_{n=1}^{L} x[n] \cdot e^{-j\omega n} \quad \text{Eq. 1c}$$

In another implementation, the VAD 226 can comprise a frequency-based moving average detector to determine whether the digital audio data 230 comprises voice information. For example, moving average operations can be executed on all of the frequency channels that constitute the operating frequency band (e.g., the 2.4 GHz operating frequency band can comprise 79 Bluetooth channels). The power level of the digital audio data 230 can be computed for each of the frequency channel. The computed power levels associated with each of the frequency channels can be compared against a corresponding threshold power level associated with the frequency channel. If the computed power level exceeds the threshold power level for a predetermined number of frequency channels, the VAD 226 can indicate the presence of voice information. It is noted, however, that various other techniques can be implemented to detect voice information; for example, the VAD 226 can comprise a harmonic signal detector to determine whether the digital audio data 230 comprises voice information.

In some implementations, in response to detecting that the digital audio data 230 comprises voice information, the VAD 226 can couple the digital audio data 230 to a speaker unit (not shown) associated with the Bluetooth device 101. In some implementations, the digital audio data 230 can also be provided to one or more post-processing units (e.g., amplifiers, filters, etc.) before being provided to a headset or other speaker unit. In some implementations, in response to detecting that digital audio data 230 does not comprise voice information, the power save unit 108 (e.g., the VAD 226 or the feedback processing unit 232 of FIG. 2) can cause the receiver unit 106 to switch to a low-power mode (e.g., the power save unit 108 can disable one or more components of the receiver unit 106). In one implementation, the VAD 226 can access the power save database 238 to determine how to operate (e.g., which processing components should be disabled/configured in a low power mode, etc.) in response to detecting the absence of voice information in the digital audio data 230. Based on accessing the power save database 238, the VAD 226 can generate one or more control signals 234 to cause the Bluetooth device 101 (the receiver unit 106 in the example of FIG. 2) to switch to the power save mode. For example, the VAD 226 can provide a control signal (e.g., a "vary bias mode signal") to the Q-signal ADC 222 to reduce the bias of the Q-signal ADC 222. As another example, the VAD 226 can also generate one or more control signals (e.g., a "disable Q-path signal") to disable one or more processing components of the Q-signal processing unit 214. Also, although not shown in FIG. 2, the VAD 226 may also generate one or more control signals to reduce the bias to the I-signal ADC 208, the bias of the I-signal mixer 204, and/or the bias of the Q-signal mixer 218. The VAD 226 may also generate one or more control signals 234 to disable one or more processing components of the I-signal processing unit 202 and/or one or more components of the digital modem unit 224.

After the Bluetooth device 101 switches to the power save mode, the power save unit 108 (e.g., the VAD 226 or the feedback processing unit 232) can continue to monitor the received packets to determine whether digital audio data extracted from the received packets comprises voice information. If the power save unit 108 determines that digital audio data extracted from a subsequently received packet comprises voice information, the power save unit 108 can generate one or more control signals 234 to enable the previously disabled processing components and/or to increase the bias of one or more processing components of the receiver unit 106 as will be further described in FIG. 4.

In some implementations, the feedback processing unit 232 (in the power save unit 108) of FIG. 2 can comprise functionality to identify an optimal operating mode (e.g., an operating mode that results in the lowest power consumption). In some implementations, the feedback processing unit 232 can comprise an adaptive filter. The feedback processing unit 232 can analyze the digital audio data 230 and can monitor the bit error rate (BER) or a cyclic redundancy check (CRC) value associated with the digital audio data 230. Typically, if the power/bias provided to the processing components of the receiver unit 106 is decreased, the sensitivity/performance of the processing components can decrease accordingly. The feedback processing unit 232 can generate one or more control signals to increase or decrease the power/bias provided to the processing components depending on the variation in the BER or CRC value associated with the digital audio data 230. For instance, if the BER associated with the digital audio data 230 is greater that a BER threshold, one or more communication settings of the communication unit 102 may be adjusted for improved performance. Furthermore, after the VAD 226 determines that the digital audio data 230 does not comprise voice information, the feedback processing unit 232 can use the variation in the BER values (or the CRC values) to determine whether to disable one or more processing components of the receiver unit 106 and if so, which of the processing components should be disabled. In another implementation, the feedback processing unit 232 of the power save unit 108 can generate the one or more control signals 234 (based on whether the VAD 226 indicates the presence or absence of voice information) to cause the Bluetooth device 101 to switch to/from the power save mode. It is noted that in some implementations, the feedback processing unit 232 may also access the power save database 228 to determine which control signals should be generated and how the Bluetooth device 101 should be configured in the power save mode.

It is noted that although FIG. 2 depicts the I-signal processing unit 202 and the Q-signal processing unit 214 comprising distinct mixer units 204 and 216 respectively, embodiments are not so limited. In other embodiments, the I-signal processing unit 202 and the Q-signal processing can share a common mixer unit. The received RF signal 112 can be provided to the shared mixer unit along with the LO signal 206. The output of the shared mixer unit (i.e., the intermediate frequency signal) can be provided to the I-signal filter stages 210 and the Q-signal filter stages 220, which can filter the intermediate frequency signal to yield the I-signal component of the intermediate frequency signal and the Q-signal component of the intermediate frequency signal respectively.

Figure 3:
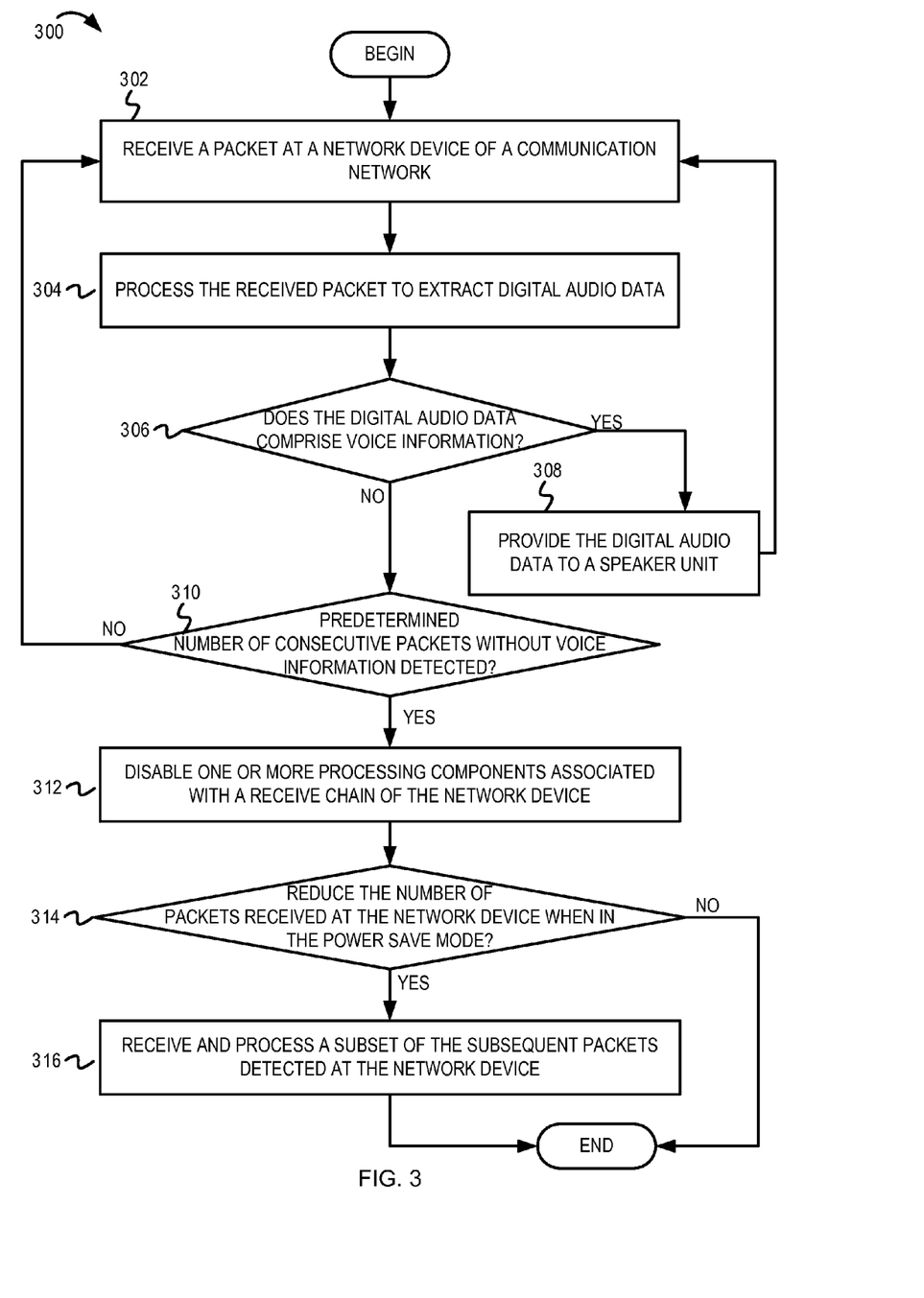
FIG. 3 is a flow diagram illustrating example operations for switching to the power save mode using a voice activity detection power save mechanism.

FIG. 3 is a flow diagram ("flow") 300 illustrating example operations for switching to the power save mode using a voice activity detection power save mechanism. The flow 300 begins at block 302.

At block 302, a packet is received at a network device of a communication network. With reference to the example of FIG. 1, the receiver unit 106 of the Bluetooth device 101 can receive an RF signal comprising one or more packets transmitted by a transmitting Bluetooth device 110 (or another suitable communication device). The flow continues at block 304.

At block 304, it is determined that the received packet comprises digital audio data and the received packet is processed to extract the digital audio data. In some implementations, the receiver unit 106 can also determine whether the packet (received at block 302) is a voice communication packet. For example, the receiver unit 106 can determine whether the received packet is a synchronous communication (SCO) packet and/or whether the packet was received via a voice communication link between the Bluetooth device 101 and the transmitting Bluetooth device 110. In some implementations, the receiver unit 106 can access a communication schedule to determine whether the received packet is a voice communication packet. In another implementation, the receiver unit 106 can determine whether the received packet is a voice communication packet based on analyzing a header of the received packet, based on a type of the transmitting Bluetooth device 110, and other such factors. If the received packet is a voice communication packet, the received packet comprises digital audio data. The digital audio data can comprise voice information (i.e., data bits generated when a user of the transmitting Bluetooth device 110 is speaking) or silence/noise information (e.g., data bits that are generated when the user of the transmitting Bluetooth device 110 is not speaking). As described above with reference to FIG. 2, the receiver unit 106 can process the one or more packets in the received RF signal 112 to extract the digital audio data 230. The flow continues at block 306.

At block 306, it is determined whether the digital audio data comprises voice information. With reference to the example of FIG. 2, the VAD 226 of the power save unit 108 can determine whether the digital audio data 230 comprises voice information. As described above, the VAD 226 can employ various suitable techniques (e.g., using harmonic signal generators, power detection techniques, etc.) to determine whether the digital audio data 230 extracted from the received RF signal 112 comprises voice information. If it is determined that the digital audio data comprises voice information, the flow continues at block 308. Otherwise, the flow continues at block 310.

At block 308, the digital audio data is provided to a speaker unit. The flow 300 moves from block 306 to block 308 after the power save unit 108 determines that the digital audio data 230 comprises voice information. In one example, the power save unit 108 can provide the digital audio data 230 (that comprises the voice information) to subsequent post-processing units. The subsequent post-processing units can further amplify/filter the digital audio data 230 and then provide the audio data to a speaker unit (e.g., a Bluetooth headset) for playback. From block 306, the flow loops back to block 302 where the receiver unit 106 attempts to receive another packet.

At block 310, it is determined whether a predetermined number of consecutive packets without voice information were detected. The flow 300 moves from block 306 to block 310 after the power save unit 108 determines that the digital audio data 230 does not comprise voice information. In one example, the power save unit 108 can determine whether digital audio data 230 extracted from the predetermined number of consecutive packets comprise voice information. In some implementations, the predetermined number of consecutive packets can be one or more consecutive packets. In other implementations, the predetermined number of consecutive packets that are used to detect the presence of voice information can be configurable. If it is determined that the predetermined number of consecutive packets do not comprise voice information, the flow continues at block 312. Otherwise, the power save unit 108 increments a counter to indicate a packet without voice information. The flow then loops back to block 302 where the receiver unit attempts to receive another packet.

At block 312, one or more processing components associated with a receive chain of the network device is disabled. The flow 300 moves from block 310 to block 312 after the power save unit 108 determines that digital audio data extracted from the received packet does not comprise voice information and that the digital audio data extracted from a predetermined number of consecutive packets did not comprise voice information. In some implementations, the power save unit 108 can provide a control signal 234 to disable one or more processing components of the receiver unit 106. In some implementations, as described above in FIG. 2, the power save unit 108 can determine to disable the Q-signal processing unit 214 (e.g., the Q-signal mixer unit 218, the Q-signal filter stages 220, the Q-signal ADC 222, and/or other processing components). In other implementations, the power save unit 108 can determine to disable the I-signal processing unit 202 (e.g., the I-signal mixer unit 208, the I-signal filter stages 210, the I-signal ADC 212, and/or other processing components). In some implementations, the power save unit 108 may also vary the bias of or the power supplied to processing components of the Q-signal processing unit 214, processing components of the I-signal processing unit 202, and/or processing components of the digital modem unit 224. In some implementations, the power save unit 108 can generate one or more control signals 234 to disable, vary the bias of, and/or reduce the power supplied to one or more processing components of the receiver unit 106. The flow continues at block 314.

At block 314, it is determined whether the number of packets received at the network device should be reduced when the network device is configured in the power save mode. For example, the power save unit 108 can determine whether the Bluetooth device 101 should be configured to receive/process a fewer number of packets (e.g., a subset of the incoming packets) when the network device is configured in the power save mode. In some implementations, if it is determined that the digital audio data 230 does not comprise any voice information, the receiver unit 106 may be configured to receive and process only a subset of all the incoming packets. For example, the receiver unit 106 may receive (and process) 1 packet out of every X packets (e.g., receive 1 out of 2 packets, 1 out of 5 packets, etc.). The rest of the packets (e.g., the packets that are not processed by the receiver unit 106) may be dropped, discarded, or ignored. For example, if the receiver unit 106 is configured to receive/process the first, third, fifth, etc. packets, the receiver unit 106 may drop (or discard or ignore) the second, fourth, sixth, etc. packets. Receiving and processing only a subset of the incoming packets when the incoming packets do not comprise voice information can further reduce power consumption at the Bluetooth device 101. If it is determined that the network device should be configured to receive and process a fewer number of packets, the flow continues at block 316. Otherwise, the flow ends.

At block 314, a subset of the subsequent packets detected at the network device are received and processed. The flow 300 moves from block 314 to block 316 after the power save unit 108 determines that the Bluetooth device 101 should be configured to receive and process and fewer number of packets when the network device is configured in the power save mode. From block 316, the flow ends. It is noted that the power save unit 108 can continuously analyze digital audio data extracted from the received packets to determine whether the received packets comprise voice information and to determine whether/when the network device should exit the power save mode.

It should be noted that although FIG. 3 depicts the power save unit 108 determining whether the receiver unit 106 of the Bluetooth device 101 should receive/process a fewer number of packets when the Bluetooth device 101 switches to the power save mode, embodiments are not so limited. In other embodiments, the power save unit 108 can automatically cause the receiver unit 106 to receive/process a fewer number of packets when the Bluetooth device 101 switches to the power save mode. Furthermore, in some implementations, receiver unit 106 may be configured to receive/process a fewer number of packets before one or more processing components of the receiver unit 106 are disabled. In other words, the operations of blocks 314/316 can be executed prior to the operations of block 312. In some implementations, instead of disabling processing components of the receiver unit (as described in block 312), the power save unit 108 can cause the one or more processing units of the receiver unit 106 to switch to a low power operating mode. It is noted that in other implementations, the power save unit 108 can execute other power saving techniques in response to determining that a predetermined number of consecutive received packets do not comprise voice information.

Figure 4:
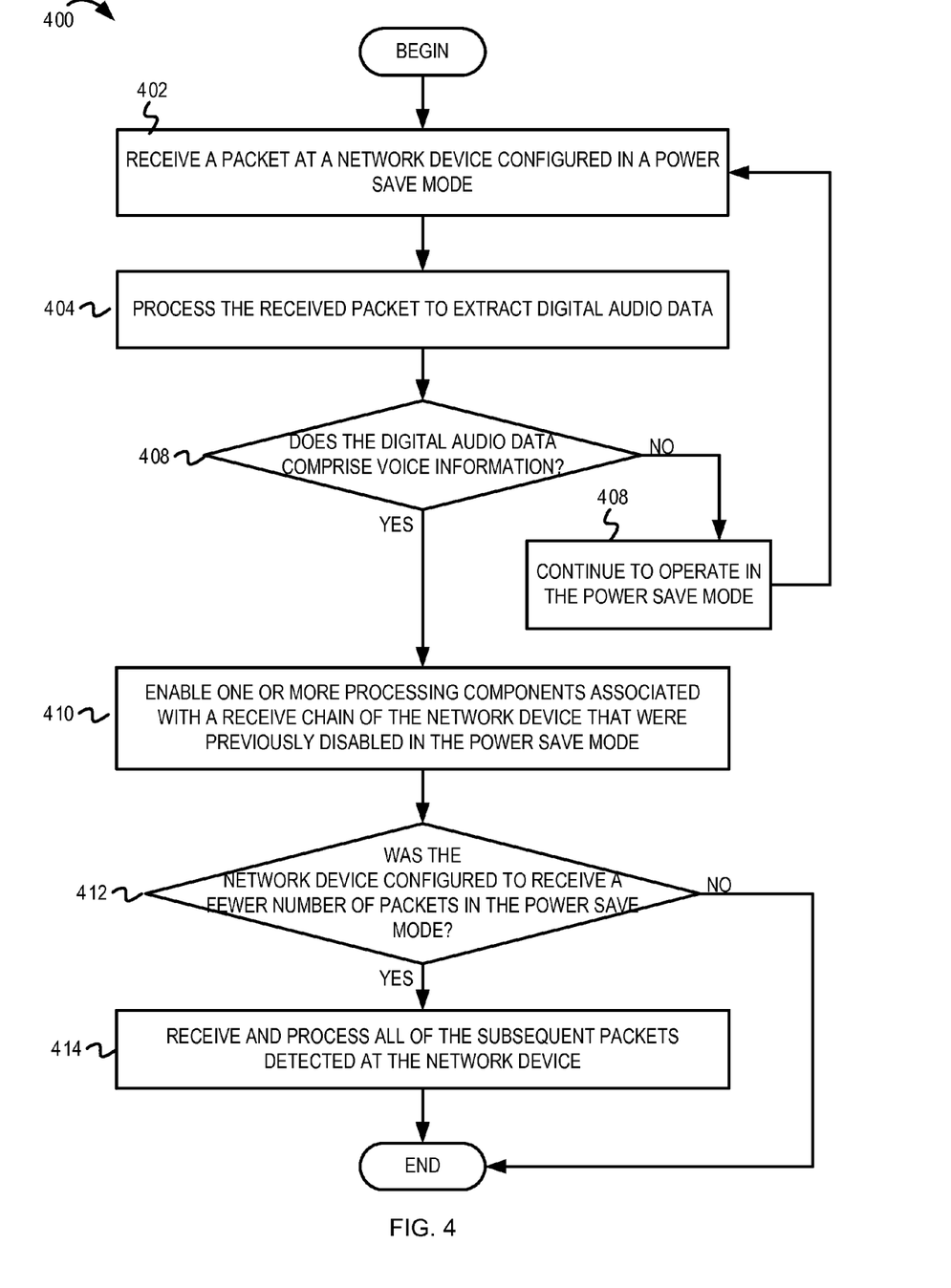
FIG. 4 is a flow diagram illustrating example operations for exiting the power save mode using a voice activity detection power save mechanism.

FIG. 4 is a flow diagram 400 illustrating example operations for exiting the power save mode using a voice activity detection power save mechanism. The flow 400 begins at block 402.

At block 402, a packet is received at a network device configured in a power save mode. With reference to the example of FIG. 1, the receiver unit 106 of the Bluetooth device 101 can receive an RF signal comprising one or more packets transmitted by a transmitting Bluetooth device 110 (or another suitable communication device), when the Bluetooth device 101 is configured in the power save mode described above in FIG. 3. The flow continues at block 404.

At block 404, the received packet is processed to extract digital audio data. For example, when the Bluetooth device 101 is configured in the power save mode, the receiver unit 106 can process the one or more packets in the received RF signal 112 to extract digital audio data 230, as described above in FIG. 2 and block 304 of FIG. 3. The flow continues at block 406.

At block 406, it is determined whether the digital audio data comprises voice information. With reference to the example of FIG. 2, when the Bluetooth device 101 is configured in the power save mode, the VAD 226 of the power save unit 108 can determine whether the digital audio data 230 comprises voice information, as described above in FIGS. 1-3. If it is determined that the digital audio data does not comprise voice information, the flow continues at block 408. Otherwise, the flow continues at block 410.

At block 408, the network device continues to operate in the power save mode. The flow 400 moves from block 406 to block 408 if the power save unit 108 determines that the digital audio data 230 extracted from the received packet does not comprise voice information. From block 408, the flow loops back to block 402 where the receiver unit 106 attempts to receive another packet.

At block 410, one or more processing components associated with a receive chain of the network device that were previously disabled in the power save mode are enabled. The flow 400 moves from block 406 to block 410 if the power save unit 108 determines that the digital audio data comprises voice information. For example, the power save unit 108 can provide one or more control signals to enable the previously disabled processing components of the receiver unit 106. As another example, the power save unit 108 can provide one or more control signals to prompt one or more processing components to switch from an idle operating mode (or a low power mode) to an active operating mode. As another example, the power save unit 108 can also increase the bias or the amount of power supplied to processing components of the I-signal processing unit 202, processing components of the Q-signal processing unit 214, and/or the processing components of digital modem unit 224. The flow continues at block 412.

At block 412, it is determined whether the network device was configured to receive a fewer number of packets in the power save mode. For example, the power save unit 108 can determine whether the Bluetooth device 101 was configured to receive a fewer number of packets in the power save mode (e.g., whether the Bluetooth device 101 was configured to receive only a subset of the incoming packets), as described above in block 310-312 of FIG. 3. If it is determined that the network device was configured to receive a fewer number of packets in the power save mode, the flow continues at block 414. Otherwise, the flow ends.

At block 414, the network device is configured to receive and process all of the subsequent packets detected at the network device. The flow 400 moves from block 412 to block 414 after the power save unit 108 determines that the Bluetooth device 101 was configured to receive a fewer number of packets in the power save mode. In some implementations, the power save unit 108 can generate one or more control signals 234 to indicate that the receiver unit 106 should receive and process all of the subsequent incoming packets after the Bluetooth device 101 exits the power save mode. From block 414, the flow ends.

It should be understood that FIGS. 1-4 are examples meant to aid in understanding embodiments and should not be used to limit embodiments or limit scope of the claims. Embodiments may perform additional operations, fewer operations, operations in a different order, operations in parallel, and some operations differently. As described above, based on whether the VAD 226 of the receiver unit 106 ("receiver VAD") detects voice information in the digital audio data 230, one or more processing components of the receiver unit 106 can be disabled. In some implementations, the probability of receiving a packet with noise as digital audio data (e.g., as the PCM data) may be high when the user of the Bluetooth device 101 is talking. In some implementations, in addition to the receiver VAD 226 in the receiver unit 106, the transmitter unit 104 may also comprise a VAD ("transmitter VAD"). The transmitter VAD may be employed to estimate whether the received RF packets comprise voice information. More specifically, the transmitter VAD can detect (using voice activity detection techniques described above in FIG. 2) the presence of voice information at the transmitter unit 104 (e.g., the transmitter VAD can determine whether a user of the Bluetooth device 101 is speaking). The transmitter VAD can estimate a confidence level at which it believes voice information is present on either a transmit communication link or a receive communication link. In some implementations, the confidence level can be normalized to provide a value between 0% and 100%, where the 100% confidence level indicates certainty that there is voice information on the communication link being analyzed and the 0% confidence level indicates certainty that there is no voice on the communication link being analyzed. The transmitter VAD can provide a notification (or the confidence level) to the receiver VAD 226 (or the feedback processing unit 232) to indicate whether voice information was detected at the transmitter unit 104. In some implementations, if voice information is detected at the transmitter unit 104, the receiver VAD 226 can determine that voice information is not being received in the received RF signal 112 (e.g., it may be assumed that if the user is speaking, the user may not be listening at the same time). Accordingly, in response to determining that voice information was detected as the transmitter VAD, the power save unit 108 may determine to disable one or more components of the receiver unit 106. In another implementation, the feedback processing unit 232 can compare the confidence level received from the transmitter VAD against a predetermined threshold. If the confidence level exceeds the predetermined threshold (e.g., if the confidence level is greater than 60%), the receiver unit of the Bluetooth device 101 can be configured in the low power mode (e.g., one or more processing units can be disabled).

In some implementations, the communication unit 102 of the Bluetooth device may be collocated with a WLAN device (or another suitable communication device). For example, Bluetooth communication functionality and WLAN communication functionality may be collocated on a common system on a chip (SoC). Typically, the Bluetooth device and the collocated WLAN device can execute coexistence mechanisms (e.g., by exchanging coexistence messages, coexistence signals, etc.) to determine whether the Bluetooth device or the collocated WLAN device has higher priority to receive their respective packets and to determine whether the Bluetooth device or the collocated WLAN device has control of a receive antenna (and other receiver processing components such as a low noise amplifier). When the Bluetooth device 101 is scheduled to receive voice information, the Bluetooth device 101 may be assigned higher priority than the collocated WLAN device for receiving Bluetooth packets. As described above, in some implementations, the receiver unit 106 (of the Bluetooth device 101) may receive only a subset of the incoming Bluetooth packets when it is determined (e.g., based on the digital audio data 230) that the incoming Bluetooth packets do not comprise voice information. Because the receiver unit 106 is configured to receive only a subset of the incoming Bluetooth packets, another communication device (e.g., the collocated WLAN device) may receive its packets (e.g., WLAN packets) when the receiver unit 106 is not receiving the incoming Bluetooth packets. For example, when voice information is not detected, the receiver unit 106 may be configured to receive 1 Bluetooth packet out of 5 incoming Bluetooth packets. Thus, after receiving the first Bluetooth packet, the receiver unit 106 may simply wait until the sixth Bluetooth packet is received. In some implementations, the receiver unit 106 can notify (e.g., via a coexistence unit) the collocated WLAN device that the Bluetooth device 101 will not be receiving Bluetooth packets for a predetermined time interval (e.g., the time interval between receiving the first Bluetooth packet and receiving the sixth Bluetooth packet). In another implementation, the coexistence unit can monitor the output of the VAD 226 and can determine whether the received RF signals comprise voice information. Accordingly, the coexistence unit can simply notify the collocated WLAN device that the collocated WLAN device has control of the communication medium to receive WLAN packets for the predetermined time interval. In another implementation, the coexistence unit can update a priority table to indicate that the collocated WLAN device has higher priority to receive WLAN packets as compared to the Bluetooth device. The collocated WLAN device can then receive incoming WLAN packets during this predetermined time interval. In some implementations, after the predetermined time interval elapses (e.g., before the sixth Bluetooth packet arrives at the receiver unit 106), the coexistence unit can update the priority table again to indicate that the Bluetooth device has higher priority to receive Bluetooth packets as compared to the WLAN device. In another implementation, the coexistence unit can monitor the output of the VAD 226. If the received RF signals comprise voice information, the coexistence unit can update the receive priority so that the Bluetooth device has the higher priority for receiving incoming Bluetooth packets.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions (e.g., executable by one or more processors). A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
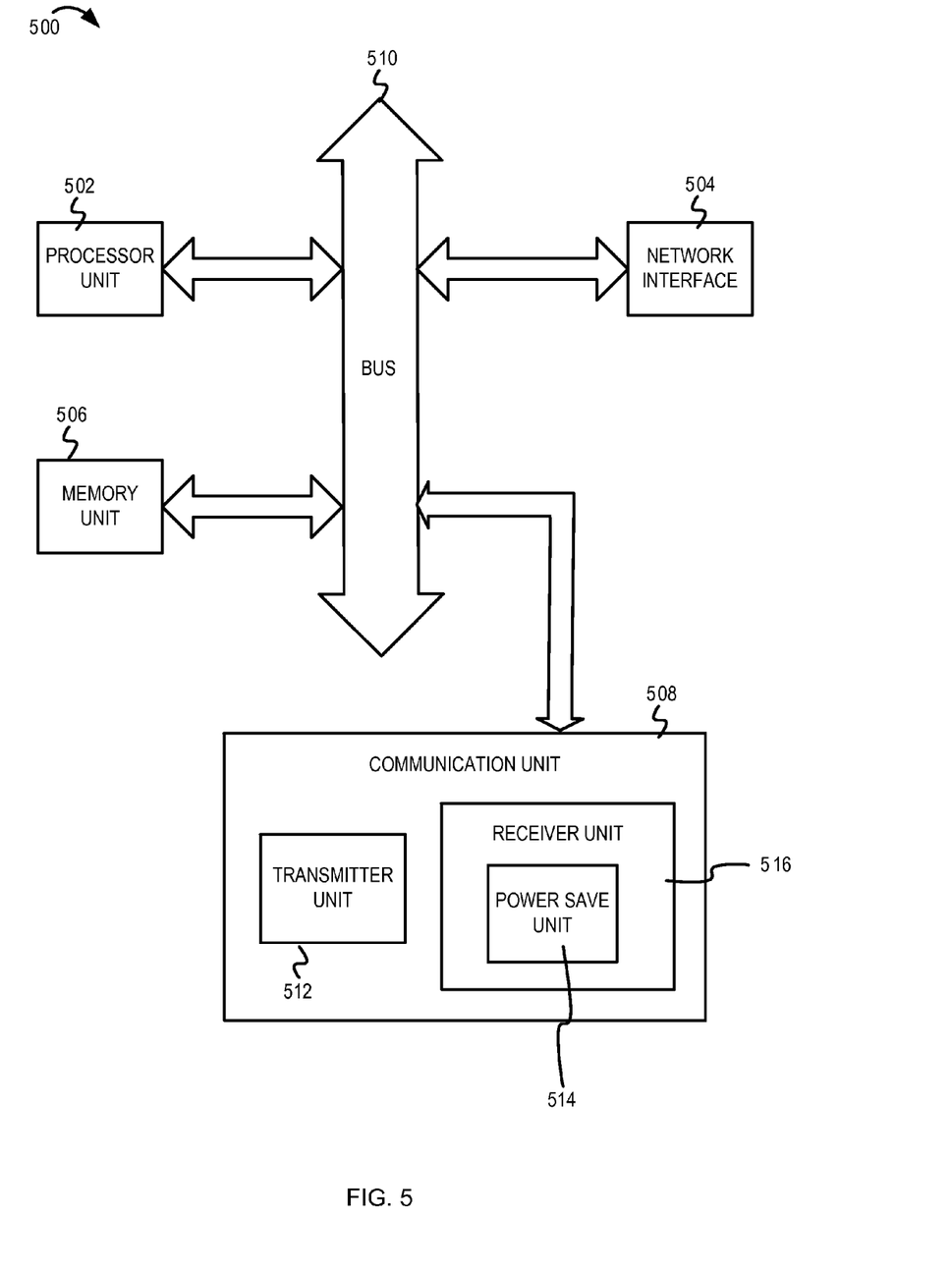
FIG. 5 is a block diagram of one embodiment of an electronic device including a power saving mechanism using voice activity detection.

FIG. 5 is a block diagram of one embodiment of an electronic device 500 including a power saving mechanism using voice activity detection. In some implementations, the electronic device 500 may be one of a laptop computer, a tablet computer, a netbook, a mobile phone, a smart appliance, a gaming console, access point, or other electronic systems comprising wireless communication capabilities. In some implementations, the electronic device 500 can comprise Bluetooth communication capabilities. The electronic device 500 may also implement other communication protocols. In some implementations, the electronic device 500 can comprise two or more integrated circuits each of which implement different communication capabilities (e.g., a WLAN communication unit collocated with a Bluetooth communication unit). The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 500 also includes a communication unit 508. The communication unit 508 comprises a transmitter unit 512 and a receiver unit 514. The receiver unit 514 comprises a power save unit 516. As described above with reference to FIGS. 1-4, the power save unit 516 implements functionality to cause the network device to switch to/from the power save mode based on the content of (e.g., the presence or absence of voice information in) incoming RF signals. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, a voice activity detection based power saving mechanism for communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving, at a first communication device, a radio frequency (RF) signal including a plurality of packets from a second communication device of a communication network;
determining that the plurality of packets include audio data;
determining a power level of each of a plurality of communication frequencies based, at least in part, on the audio data, wherein the plurality of communication frequencies are associated with an operating frequency band of the first communication device;
determining whether the audio data associated with the plurality of packets includes voice information based, at least in part, on comparing the power level of each of the plurality of communication frequencies against a corresponding power level threshold; and
switching to a power save mode at the first communication device based, at least in part, on determining that the audio data does not include voice information.

2. The method of claim 1, wherein said switching to the power save mode at the first communication device comprises:
disabling a processing component of a receiver unit of the first communication device to switch to the power save mode.

3. The method of claim 2, wherein, if the receiver unit of the first communication device includes an in-phase (I) signal processing path and a quadrature (Q) signal processing path, said disabling the processing component of the receiver unit of the first communication device to switch to the power save mode comprises at least one of:
disabling a first processing component of the I-signal processing path;
configuring a second processing component of the I-signal processing path in a low power consumption mode;
disabling a first processing component of the Q-signal processing path; and
configuring a second processing component of the Q-signal processing path in the low power consumption mode.

4. The method of claim 1, wherein in response to determining that the audio data does not include voice information, the method further comprises:
processing a subset of a plurality of additional packets received at the first communication device from the second communication device to determine whether the subset of the additional packets include voice information; and
discarding a remainder of the plurality of additional packets in response to determining that the audio data associated with the subset of the additional packets does not include voice information.

5. The method of claim 1, wherein said switching to the power save mode comprises:
reducing a bias provided to a processing component of a receiver unit of the first communication device, or
reducing a power provided to the processing component of the receiver unit.

6. The method of claim 5, wherein the processing component comprises at least one of a mixer unit, a filter unit, an analog-to-digital conversion unit, and a digital modem unit.

7. The method of claim 1, further comprising:
receiving, at the first communication device, a subsequent RF signal including a subsequent packet from the second communication device;
determining whether audio data of the subsequent packet includes voice information based, at least in part, on comparing an energy level associated with the audio data of the subsequent packet against an energy threshold; and
exiting from the power save mode and switching to an active operating mode in response to determining that the energy level exceeds the energy threshold.

8. The method of claim 1, further comprising executing harmonic signal detection operations for determining whether the audio data associated with the plurality of packets includes voice information.

9. The method of claim 1, wherein said determining whether the audio data includes voice information comprises:
determining that the audio data includes voice information in response to determining that the power level of each of a predetermined number of communication frequencies exceeds the corresponding power level threshold; and
determining that the audio data does not include voice information in response to determining that the power level of each of the predetermined number of communication frequencies does not exceed the corresponding power level threshold.

10. The method of claim 1, further comprising:
receiving, at the first communication device, a subsequent RF signal including a subsequent packet from the second communication device;
determining that audio data extracted from the subsequent packet includes voice information; and
exiting from the power save mode and switching to an active operating mode, in response to determining that the audio data extracted from the subsequent packet includes voice information.

11. The method of claim 10, wherein said exiting from the power save mode and switching to the active operating mode comprises at least one of:
enabling a processing component of a receiver unit of the first communication device that was disabled when the first communication device was configured in the power save mode;
increasing a bias provided to the processing component of the receiver unit; or
increasing a power provided to the processing component of the receiver unit.

12. The method of claim 1,
wherein said determining whether the audio data includes voice information comprises determining whether the audio data associated with a predetermined number of consecutive packets includes voice information; and
wherein said switching to the power save mode is in response to determining that the audio data associated with the predetermined number of consecutive packets does not include voice information.

13. The method of claim 1,
wherein the first communication device is a network device with Bluetooth communication capabilities;
wherein said determining that the plurality of packets include audio data comprises:
determining that the first communication device is configured in an audio communication mode; and
processing the plurality of packets to detect that the plurality of packets include audio data.

14. The method of claim 13, wherein the audio communication mode is a synchronous communication (SCO) mode.

15. The method of claim 1, further comprising:
determining whether voice information is detected at a transmitter unit of the first communication device; and
determining whether to switch the first communication device to the power save mode based, at least in part, on whether voice information is detected at the transmitter unit of the first communication device.

16. The method of claim 15, wherein said determining whether to switch the first communication device to the power save mode comprises:
determining to configure the first communication device in the power save mode based, at least in part, on determining that voice information is detected at the transmitter unit and that the audio data associated with the plurality of packets does not include voice information; and
determining not to configure the first communication device in the power save mode based, at least in part, on determining that voice information is not detected at the transmitter unit and that the audio data associated with the plurality of packets includes voice information.

17. The method of claim 1, wherein, when the first communication device is collocated with a third communication device of the communication network, said switching to the power save mode at the first communication device further comprises:
determining that the first communication device has control of a communication medium and is configured to receive a first subsequent packet and a second subsequent packet, wherein the first subsequent packet and the second subsequent packet are not consecutively received at the first communication device;
determining a time interval between the first subsequent packet and the second subsequent packet; and
causing the collocated third communication device to gain control of the communication medium and to receive a packet intended for the collocated third communication device during the time interval between the first subsequent packet and the second subsequent packet.

18. A method comprising:
receiving, at a first communication device, a radio frequency (RF) signal including a plurality of packets from a second communication device of a communication network;
determining that the plurality of packets include audio data;
determining whether the audio data includes voice information;
switching to a power save mode at the first communication device based, at least in part, on determining that the audio data does not include voice information;
processing a subset of a plurality of additional packets received at the first communication device from the second communication device to determine whether the subset of the additional packets include voice information and whether to exit the power save mode; and
discarding a remainder of the additional packets in response to determining that audio data associated with the subset of the additional packets does not include voice information.

19. The method of claim 18, wherein said switching to the power save mode comprises at least one of:
disabling a first processing component of a receiver unit of the first communication device,
reducing a bias provided to a second processing component of the receiver unit, and
reducing a power provided to a third processing component of the receiver unit.

20. The method of claim 18, wherein said determining whether the audio data associated with the plurality of packets includes voice information comprises:
determining a power level of each of a plurality of communication frequencies based, at least in part, on the audio data, wherein the plurality of communication frequencies are associated with an operating frequency band of the first communication device; and
determining whether the audio data associated with the plurality of packets includes voice information based, at least in part, on comparing the power level of each of the plurality of communication frequencies against a corresponding power level threshold.

21. The method of claim 18, wherein,
said determining whether the audio data includes voice information comprises determining whether the audio data associated with a predetermined number of consecutive packets includes voice information; and
said switching to the power save mode is in response to determining that the audio data associated with the predetermined number of consecutive packets does not include voice information.

22. The method of claim 18, further comprising:
exiting from the power save mode and switching to an active operating mode, in response to determining that the audio data extracted from the subset of the additional packets includes voice information.

23. A first communication device comprising:
a transceiver unit operable to receive a radio frequency (RF) signal including a plurality of packets from a second communication device of a communication network; and
a power save unit of the transceiver unit, the power save unit operable to:
determine that the plurality of packets include audio data;
determine a power level of each of a plurality of communication frequencies based, at least in part, on the audio data, wherein the plurality of communication frequencies are associated with an operating frequency band of the first communication device;
determine whether the audio data includes voice information based, at least in part, on comparing the power level of each of the plurality of communication frequencies against a corresponding power level threshold; and
switch to a power save mode at the first communication device based, at least in part, on determining that the audio data does not include voice information.

24. The first communication device of claim 23, wherein the power save unit operable to switch to the power save mode at the first communication device comprises at least one of:
the power save unit operable to disable a first processing component of the transceiver unit,
the power save unit operable to reduce a bias provided to a second processing component of the transceiver unit, and
the power save unit operable to reduce a power provided to a third processing component of the transceiver unit.

25. The first communication device of claim 23, wherein in response to determining that the audio data does not include voice information, the power save unit is further operable to:
process a subset of a plurality of additional packets received at the first communication device from the second communication device to determine whether the subset of the additional packets include voice information; and discard a remainder of the plurality of additional packets in response to determining that the audio data associated with the subset of the additional packets does not include voice information.

26. The first communication device of claim 23,
wherein the power save unit operable to determine whether the audio data includes voice information comprises the power save unit operable to determine whether the audio data associated with a predetermined number of consecutive packets includes voice information; and
wherein the power save unit is operable to switch to the power save mode at the first communication device in response to determining that the audio data associated with the predetermined number of consecutive packets does not include voice information.

27. The first communication device of claim 23, wherein the power save unit is further operable to:
receive a subsequent RF signal including a subsequent packet from the second communication device;
determine that audio data extracted from the subsequent packet received includes voice information; and
exit from the power save mode and switch to an active operating mode, in response to determining that the audio data extracted from the subsequent packet includes voice information.

28. A non-transitory machine-readable storage medium having instructions stored therein, which when executed by a processor causes the processor to perform operations that comprise:
receiving a radio frequency (RF) signal including a plurality of packets at a first communication device from a second communication device of a communication network;
determining that the plurality of packets include audio data;
determining a power level of each of a plurality of communication frequencies based, at least in part, on the audio data, wherein the plurality of communication frequencies are associated with an operating frequency band of the first communication device;
determining whether the audio data associated with the plurality of packets includes voice information based, at least in part, on comparing the power level of each of the plurality of communication frequencies against a corresponding power level threshold; and
switching to a power save mode at the first communication device based, at least in part, on determining that the audio data does not include voice information.

29. The non-transitory machine-readable storage medium of claim 28, wherein said operation of switching to the power save mode at the first communication device comprises at least one of:
disabling a first processing component of a receiver unit of the first communication device,
reducing a bias provided to a second processing component of the receiver unit, and
reducing a power provided to a third processing component of the receiver unit.

30. The non-transitory machine-readable storage medium of claim 28, wherein in response to determining that the audio data does not include voice information, the operations further comprise:
processing a subset of a plurality of additional packets received at the first communication device from the second communication device to determine whether the subset of the additional packets include voice information; and
discarding a remainder of the plurality of additional packets in response to determining that the audio data associated with the subset of the additional packets does not include voice information.

31. A first communication device comprising:
means for determining that a plurality of packets received in a radio frequency (RF) signal from a second communication device include audio data;
means for determining a power level of each of a plurality of communication frequencies based, at least in part, on the audio data, wherein the plurality of communication frequencies are associated with an operating frequency band of the first communication device;
means for determining whether the audio data associated with the plurality of packets includes voice information based, at least in part, on comparing the power level of each of the plurality of communication frequencies against a corresponding power level threshold; and
means for switching to a power save mode at the first communication device based, at least in part, on determining that the audio data does not include voice information.

32. The first communication device of claim 31, wherein said means for switching to the power save mode at the first communication device comprises at least one of:
means for disabling a first processing component of a receiver unit of the first communication device,
means for reducing a bias provided to a second processing component of the receiver unit, and
means for reducing a power provided to a third processing components of the receiver unit.

33. The first communication device of claim 31, further comprising:
in response to determining that the audio data does not include voice information,
means for processing a subset of a plurality of additional packets received at the first communication device from the second communication device to determine whether the subset of the additional packets include voice information; and
means for discarding a remainder of the plurality of additional packets in response to determining that the audio data associated with the subset of the additional packets does not include voice information.

34. The first communication device of claim 31,
wherein said means for determining whether the audio data includes voice information comprises means for determining whether the audio data associated with a predetermined number of consecutive packets includes voice information; and
wherein said means for switching to the power save mode at the first communication device is in response to determining that the audio data associated with the predetermined number of consecutive packets does not include voice information.

35. The method of claim 20, wherein said determining whether the audio data associated with the plurality of packets includes voice information comprises:
determining that the audio data associated with the plurality of packets includes voice information in response to determining that the power level of each of a predetermined number of communication frequencies exceeds the corresponding power level threshold; and determining that the audio data associated with the plurality of packets does not include voice information in response to determining that the power level of each of the predetermined number of communication frequencies does not exceed the corresponding power level threshold.

36. The first communication device of claim 23, wherein the power save unit operable to determine whether the audio data includes voice information comprises the power save unit operable to:
   determine that the audio data includes voice information in response to determining that the power level of each of a predetermined number of communication frequencies exceeds the corresponding power level threshold; and
   determine that the audio data does not include voice information in response to determining that the power level of each of the predetermined number of communication frequencies does not exceed the corresponding power level threshold.

37. The non-transitory machine-readable storage medium of claim 28, wherein said operation for determining whether the audio data includes voice information comprises:
   determining that the audio data includes voice information in response to determining that the power level of a predetermined number of communication frequencies exceeds the corresponding power level threshold; and
   determining that the audio data does not include voice information in response to determining that the power level of the predetermined number of communication frequencies does not exceed the corresponding power level threshold.

* * * * *